United States Patent [19]

Gold

[11] Patent Number: 4,805,363
[45] Date of Patent: Feb. 21, 1989

[54] WINDOW RETENTION SYSTEM FOR AUTOMOTIVE VEHICLES

[76] Inventor: Peter Gold, 465 North Wood Rd., Rockville Centre, N.Y. 11570

[21] Appl. No.: 194,883

[22] Filed: May 17, 1988

[51] Int. Cl.⁴ .............................. E06B 3/56; B60J 1/02
[52] U.S. Cl. ...................................... 52/208; 52/400; 52/302; 296/93; 296/201
[58] Field of Search ................. 52/397, 208, 400, 302, 52/127.4; 296/93, 201

[56] References Cited

U.S. PATENT DOCUMENTS

| | | | |
|---|---|---|---|
| 2,549,315 | 4/1951 | Kramer | 52/400 |
| 3,336,707 | 8/1967 | Horgan, Jr. | 52/400 |
| 4,165,119 | 8/1979 | Hedeen et al. | 52/400 |
| 4,434,593 | 3/1984 | Horike et al. | 52/208 |

*Primary Examiner*—David A. Scherbel
*Assistant Examiner*—Michele A. Van Patten
*Attorney, Agent, or Firm*—Collard, Roe and Galgano

[57] ABSTRACT

An apparatus for retaining a window panel on an outer surface of a flanged body panel of an automotive vehicle body is to be used with a curable adhesive. The apparatus utilizes a decorative trim portion adapted to bridge the space between the window panel and the flanged body panel while overlying both the outer surface of the window panel and outer metal frame of the vehicle body. The decorative trim includes a resiliently yieldable stem extruded integrally therewith and extending generally perpendicularly therefrom for insertion into the space between the window panel and the body panel. The stem includes extensions which extend generally radially outwardly therefrom and are adapted to project into the curable adhesive, thereby attaching the decorative trim portion to the vehicle body. A flange on the flanged body portion includes a plurality of holes communicating with the space between the window and the body. A plurality of retaining elements are attached to the inner surface of the flange. Each of the retaining elements has an interior portion thereof in communication with each of the openings in the flange for receiving the curable adhesive. The cross-section of this interior portion is greater than the cross-section of the openings in the flange whereby a mechanical interlock is formed between the curable adhesive, upon the curing thereof, and the inner surface of the flange.

7 Claims, 1 Drawing Sheet

WINDOW RETENTION SYSTEM FOR AUTOMOTIVE VEHICLES

BACKGROUND OF THE INVENTION

1. The Field of the Invention

This invention relates to a system for retaining an automotive glass window, such as a windshield, on the vehicle body. More particularly, this invention relates to a novel retention system to be used with a known molding which is inserted around the edge of the windshield and retained on the vehicle body by a curable adhesive.

2. Description of the Prior Art

It is common to utilize curable sealants such as urethane sealants to mechanically retain stationary windows on motor vehicles. Normally, this retention scheme also includes a decorative trim which conceals the cavity between the glass and the outer painted metal panel or flange of the motor vehicle body. This trim is also retained by the urethane sealant. It has been found, however, that the bond between the urethane sealant and the painted metal flange on the vehicle body is either not initially formed properly or deteriorates through time such that the windshield loosens and allows leaks to develop. For example, the retaining function of the sealant can be reduced between the sealant and the body panel by oxidation of paint and/or metal, acid rain, ultraviolet light, torsional and bending movement, vibration, etc., and/or a combination of these factors.

This problem is especially prevalent in the urethane sealant application method taught in U.S. Pat. No. 4,165,119 which issued on Aug. 21, 1979 and is assigned to General Motors Corporation. In this design the urethane sealant acts as the sole retaining element to retain the windshield as well as a decorative trim. If partial retention is lost between the urethane sealant and the flange of the vehicle body, it can result in leakage.

There has been a long-felt need to provide a system which enhances the bond between the urethane sealant and the flange of the motor vehicle which, while still utilizing the curable urethane sealant, provides an additional mechanical interlock between the sealant and the vehicle body such that a failure in the bond does not result in a loss of mechanical retention. In addition, since the above-described prior art retention method is utilized on hundreds of thousands of motor vehicles each year, it is absolutely necessary that the proposed method of enhancing the mechanical interlock be easily adapted to mass production and require little additional labor to implement.

Accordingly, it is an object of the invention to provide a system for enhancing the mechanical retention of a window on a flanged body panel of an automotive vehicle body utilizing a curable urethane sealant.

It is yet an additional object of this invention to provide an apparatus which utilizes the urethane sealant to form a secondary mechanical attachment to the flanged body panel whereby mechanical retention is not lost should the bond between the urethane sealant and the vehicle flange lose its retention strength.

It is yet a further object of the invention to provide a retaining system for a vehicle windshield which is simple in construction, economical in fabrication and is simple to install.

SUMMARY OF THE INVENTION

Accordingly, these objects are achieved by an apparatus for retaining a window panel on an outer surface of a flanged body panel of an automotive vehicle body by use of a curable adhesive. The apparatus includes a decorative trim portion adapted to bridge a space between the window and the flanged body panel and which trim overlies the outer surface of both the window and the vehicle body. The decorative trim portion includes a resiliently yieldable stem extruded integrally with the decorative trim portion and extends generally perpendicularly therefrom for insertion into the space between the window panel and the body panel. The stem of the decorative trim portion includes at least one extension integral therewith which extends generally radially outwardly therefrom and is adapted to project into the curable urethane adhesive to attach the decorative trim portion to the vehicle body. The flange on the flanged body panel includes a plurality of openings therethrough which communicate with a vehicle space interior of the window panel and the flanged body panel.

A plurality of retaining elements are attached to an inner surface of the flange with each of the retaining elements having an interior portion in communication with the openings in the flange for receiving the curable adhesive. The cross-section of the interior portion of each of the retaining elements is greater than the cross-section of the openings whereby a mechanical interlock is formed between the curable adhesive and the inner surface of the flange when the adhesive cures.

The retaining element may be a plastic adhesive cap having a generally cylindrical interior having its outer end closed and its inner end open. The inner end of the cap has a radially extending flange adapted to be retained on the inner surface of the flange on the flanged body panel. It is contemplated that the radial flange surface on the plastic cap have an adhesive thereon so that the cap may be placed over the plurality of holes and retained thereover during the assembly process.

To ensure that the hollow plastic cap is filled with urethane sealant during the installation of the window and to insure that the application of sealant does not dislodge the cap, one or more vents or outlets are formed through the wall of the hollow tubular portion of the cap so that air and excess sealant may be vented during the application of the sealant. Since it is possible that some sealant will exit the outlet during installation, a plastic adhesive tape may be placed on the adjacent surface of the headliner which forms the interior of the motor vehicle. This headliner may be made of a fabric material and extends on the interior of the motor vehicle away from the windshield and along the automobile roof.

These and other objects and advantages of the present invention will become apparent from the following description of the accompanying drawing, which discloses one embodiment of the present invention. It is to be understood that the drawing is to be used for the purpose of illustration only, and not as a definition of the invention.

BRIEF DESCRIPTION OF THE DRAWING

In the drawing, where similar reference numerals denote similar elements throughout the several views.

DETAILED DESCRIPTION OF THE PREFERRED EMBODIMENT

Figure 1:
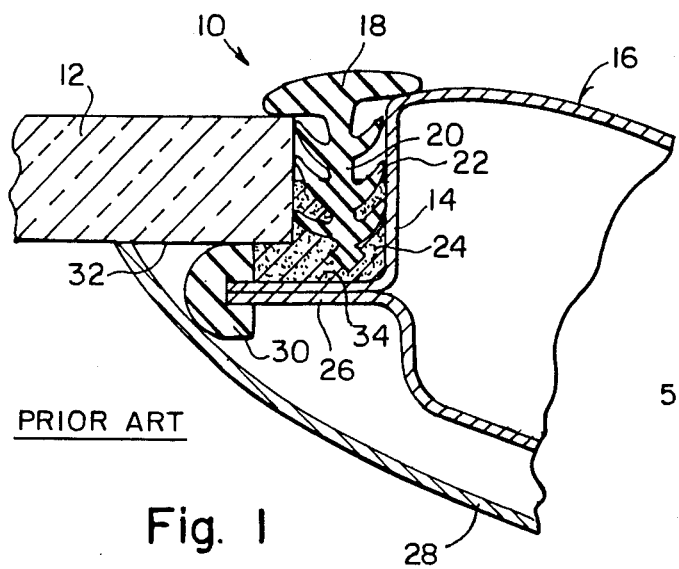
FIG. 1 is a cross-sectional view of the prior art window retention system.

Referring now in detail to FIG. 1, there is shown a prior art window retention system generally denoted as 10. In the prior art system, a window 12, such as automotive windshield, is retained on a flanged body panel 14 of an automotive vehicle body 16. A decorative trim portion 18 is adapted to bridge the space between window panel 12 and flanged body panel 14. Decorative trim portion 18 includes a resiliently yieldable stem 20 which extends generally perpendicularly from decorative trim portion 18 towards the interior of the vehicle. Stem 20 is adapted to be inserted into a space between window panel 12 and flanged body panel 14. Stem 20 includes at least one and in some cases, a plurality, of extensions 22 integrally formed with stem 20 and extending generally radially outwardly therefrom and adapted to project into a curable adhesive or sealant 24. Upon curing, sealant 24 positively retains decorative trim portion 18 and window panel 12 onto vehicle body 16 by the mechanical engagement of extensions 22 within sealant 24 and the bond of sealant 24 to flanged body portion 14. Sealant 24 also serves to retain window panels 12 on flanged body portion 14 and forms, in combination with trim portion 18, a weather seal around the window.

Often, a headliner 28, generally made of fabric material, is utilized to form an esthetically pleasing interior surface of the vehicle occupant compartment (not shown). Also, a spacer 30 is often utilized to space panel 12 from flange 26 and to provide a seal between the inner surface 32 of window 12 and the outer surface 34 of flange 26. This seal prevents sealant 24 from entering the vehicle interior and damaging headliner 28.

Figure 2:
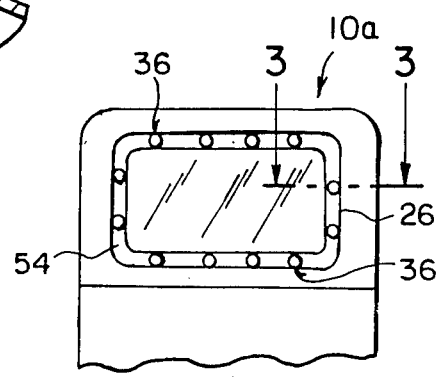
FIG. 2 is an elevation view of a window utilizing the window retention system of the present invention.
Figure 3:
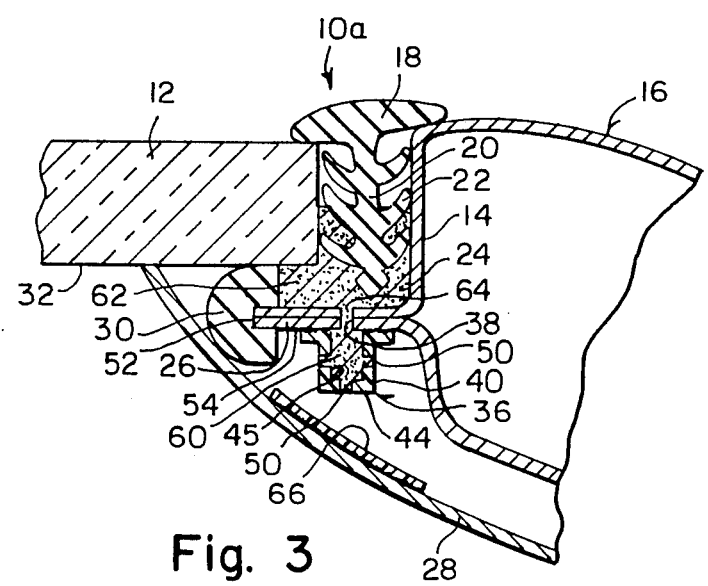
FIG. 3 is a cross-sectional view of the window-retention system shown in FIG. 2 along the lines 3—3.

Referring now to FIG. 2, there is shown an elevation view of the window retaining system of the present invention which is generally denoted as 10a. This system utilizes a series of retaining elements 36 spaced at predetermined intervals along an interior surface 54 of flange 26 and serving to form additional mechanical interconnections with the curable adhesive sealant as will be described below. Referring to FIG. 3, there is shown a cross-sectional view of retaining system 10a of the present invention. Since many of the elements of retention system 10a are identical to those of the prior art shown in FIG. 1, the same reference numerals are utilized to depict identical parts.

In the present invention, the window panel 12 is again retained on vehicle body 16 with sealant 24. The decorative trim portion 18 is also retained via the interaction of extension 22. However, in the embodiment of the present invention, flange 26 of flange portion 14 includes a plurality of openings 38 spaced around the periphery thereof to define the predetermined intervals between retaining elements 36. Normally, openings 38 have a circular cross-section and are formed at the same time flange 26 is formed.

Figure 4:
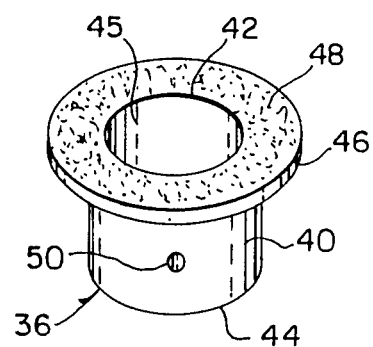
FIG. 4 is an isometric view of the retaining element of the window-retention system of the present invention.

Referring to FIG. 4, retaining element 36 is shown which is formed from a hollow generally cylindrical body portion 40. Body portion 40 is open at a first end 42 thereof, and is closed at a second end 44, thereby forming a partially enclosed interior volume 45. Adjacent end 42 of hollow cylindrical body 40 is a generally radially outwardly extending flange portion 46 having an inner surface 48 coated with an adhesive material. Retaining element 36, including body portion 40 and flange 48, may be formed from plastic. Body portion 40 also includes at least one vent outlet 50 so that air and/or excess sealant may be vented from the hollow interior portion during the application of sealant 24 in the formation of the window retention system 10a. Additional vent outlets 50 may be utilized around body portion 40 or in end 44 thereof.

The assembly of window retaining system 10a on an automotive vehicle body having a flange body panel 14 is very similar to the prior art system. Initially, sealing element 30 is affixed to the edge 52 of flange 26, which flange is formed around the entire periphery of the window opening. Contemporaneously, retaining elements 36 are placed over openings 38 in flange 26 with the adhesive on surface 48 being placed against inner surface 54 of flange 26. A glass window panel 12 is then placed within flanged body panel 14 against sealing element 30 and curable sealant 24, such as a urethane sealant, is then applied, preferably under pressure, into a space of predetermined size (usually in the range of two to five millimeters) between the edge of glass panel 12 and flanged body portion 14. Opening 38 has a sufficient cross-section to allow sealant 24 to enter and fill interior 45 of retaining element 36 with any air or excess sealant trapped therein venting through vent outlets 50. As the sealant is typically black, the retaining elements are preferably made from a clear or translucent plastic to allow the installer, when possible, to view the filling of the retaining elements and to thereby prevent or minimize the overfilling thereof.

Prior to curing, decorative trim portion 18 is placed around the periphery of window panel 12, thereby forming a decorative closure of the space between the edges of panel 12 and flange body portion 14 and also serving, via the interaction of extensions 22, into sealant 24 to serve as a weather seal for window panel 12 and vehicle body 16.

Referring again to FIG. 3, it is shown that interior 45 of retaining element 36 has a larger cross-section than the cross-section of opening 38 in flange 26. Consequently, upon curing, now rubberized sealant 24 forms a mechanical interlock between rubberized inner portion 60, corresponding to the interior of locking element 36, and surface 54 of flange 26. Inner portion 60 is connected to rubberized outer portion 62 by connecting portion 64. Portion 62, in turn, is bonded to and captured by extensions 22 of decorative trim portion 18.

It can be seen that if the bond between portion 62 and inside surface of flanged body panel 14 were to fail, the window would still be prevented from movement away from flange 26 by the action of portion 60 against inner flange surface 54 via retention forces transmitted from trim portion 18 through portion 64. The cross-sections of the hollow interior 45 of retaining element 36, and hence the cross-section of portion 60, and the size of opening 38 and hence of connecting portion 64 of cured sealant 24, are sized to provide sufficient retaining forces even should the entire bond between portion 62 and the interior surfaces of flanged body panel 14 fail.

If desired, a plastic adhesive tape 66 may be affixed to the interior of headliner 28 to ensure that any sealant 24 escaping through vent holes 50 during installation does not fall upon and detrimentally affect the esthetic appearance of headliner 28. Adhesive tape 66 is especially important if a vent outlet 50 is placed at lower end 44 of retaining element 36 as shown in FIG. 3.

It can be seen that the window retaining apparatus of the present invention provides additional retention power in automotive vehicle glass systems which use a curable sealant such as urethane. In addition, the system of the present invention can be utilized on other window retention systems, such as reaction injected molded framed automotive glass parts and systems that use heat transfer systems, which normally do not use urethane sealants, but which can use the system of the present invention to provide for additional retention strength.

While one embodiment of the present invention has been described and/or shown, it is obvious that many changes and modifications may be made thereunto without departing from the spirit and scope of the invention.

What is claimed is:

1. An apparatus for use with a curable adhesive for retaining a window panel supported on a flanged body panel of an automotive vehicle body, said apparatus comprising:

a flange on the flanged body panel having an outer surface on which the window panel is retained by the curable adhesive and having a plurality of openings therethrough; and a plurality of retaining elements attached to an inner surface of said flange, each of said retaining elements having an interior portion thereof in communication with each of said openings in said flange and receiving the curable adhesive, the cross-section of said interior portion receiving the curable adhesive of each of said retaining elements being greater than the cross-section of said openings in said flange whereby a mechanical interlock is formed between the curable adhesive, upon the curing thereof, and the inner surface of the said flange.

2. An apparatus as set forth in claim 1, further comprising:

a decorative trim portion adapted to bridge a space between the window panel and the flanged body panel in overlying engagement therewith;

a resiliently yieldable stem extruded integrally with said decorative trim portion and extending generally perpendicularly therefrom for insertion into said space between the window panel and the flanged body panel; and at least one extension integral with said stem and extending generally radially outwardly therefrom and adapted to project into the curable adhesive to attach said decorative trim portion to the vehicle body.

3. An apparatus as set forth in claim 1, wherein each of said retaining elements is a hollow cylinder having a first end thereof open and a second end thereof closed, said first open end including a radially outwardly extending flange portion for engaging said inner surface of said flange.

4. An apparatus as set forth in claim 1, further including a sealing element disposed between the window panel and the outer surface of said flange to thereby support said window panel a predetermined distance from the outer surface of said flange.

5. An apparatus as set forth in claim 1, wherein each of said retaining elements includes an outlet for venting said interior portion thereof upon receiving said curable adhesive therein.

6. An apparatus as set forth in claim 5, wherein said flange on each of said retaining elements includes an adhesive coated surface thereon adapted to contact said inner surface of said flange for holding said retaining elements thereon.

7. An apparatus as set forth in claim 5, further including a means for preventing curable adhesive exiting said outlet from coming into direct contact with an interior surface of the automotive vehicle body.

* * * * *